United States Patent [19]

Suzuki

[11] 3,852,543
[45] Dec. 3, 1974

[54] DIRECTION INDICATOR AUTOMATIC RETURN DEVICE

[75] Inventor: Masaru Suzuki, Takemura Atusi, Chiryu, Japan

[73] Assignee: Kabushiki Kaisha Tokai Rika Denki Seisakusho, Nishikasugai-gun, Aichi-ken, Japan; by said Suzuki

[22] Filed: Dec. 20, 1972

[21] Appl. No.: 316,821

[30] Foreign Application Priority Data
Dec. 28, 1971 Japan............................ 47-1174[U]

[52] U.S. Cl........... 200/61.27, 200/61.3, 200/61.34, 200/61.35
[51] Int. Cl. ............................................ H01h 3/16
[58] Field of Search....................... 200/61.27, 61.38

[56] References Cited
UNITED STATES PATENTS

| | | | |
|---|---|---|---|
| 2,725,435 | 11/1955 | Cislo | 200/61.34 |
| 2,800,541 | 7/1957 | Brown et al. | 200/61.34 |
| 2,999,911 | 9/1961 | Dryer et al. | 200/61.34 |
| 3,076,067 | 1/1963 | Dryer et al. | 200/61.3 |
| 3,201,536 | 8/1965 | Fisher et al. | 200/61.3 X |
| 3,254,169 | 5/1966 | Fuqua | 200/61.34 |
| 3,372,252 | 3/1968 | Stoi et al. | 200/61.34 |
| 3,462,570 | 8/1969 | Poleschuk | 200/61.27 |
| 3,604,867 | 9/1971 | Suzuki | 200/61.34 |
| 3,609,264 | 9/1971 | Suzuki et al. | 200/61.34 |

Primary Examiner—James R. Scott
Attorney, Agent, or Firm—Craig & Antonelli

[57] ABSTRACT

A direction indicator automatic return device in a motor-vehicle direction indicator, wherein a movable bracket is made of synthetic resin, forms a curved spherical portion which passes round opposite sides of a steering column, and has a pair of cantileverlike ratchet arms, each of which is supported at one end, is separated by a narrow gap and a wider gap from the curved spherical portion, and has in approximately its centre portion an engagement projection which faces one side of the steering column and is brought into a position where it can be engaged by a restoring cam upon left or right turn indication operation.

6 Claims, 4 Drawing Figures

PATENTED DEC 3 1974

DIRECTION INDICATOR AUTOMATIC RETURN DEVICE

The present invention relates to an automatic restoring or return device for motor-vehicle direction indicators.

In a motor-vehicle direction indicator with a main body supporting a movable bracket which can be turned to a left turn indication position, a right turn indicator position, and a neutral position, provided around a restoring cam, which is secured to a steering column to rotate together with the steering column, if for any reason the bracket cannot be turned back after it is turned to the left or right turn indication positions, the steering column cannot be turned back, which could cause a serious accident.

The object of the present invention is to provide an improved automatic restoring device for motor-vehicle direction indicators which enables turn back of the steering column even if for any reason the bracket cannot be turned back after it is turned to the left or right indication position, whereby the danger of the steering column not being able to be turned back, which could cause a serious accident, is elliminated.

To achieve the above object, in the automatic restoring device for direction indicators according to the present invention, a pair of contilever-like ratchet arms are provided on a synthetic resin movable bracket mounted on a main body and able to turn from a central, neutral position to left or right turn indication positions, where it is temporarily held by an angle control device; the ratchet arms bend smoothly out of the way of a restoring cam when a steering column is turned for a change of direction or on the very few occasions when return of the movable bracket is hindered, but when the steering column is turned back, this flexion is largely restricted by the restoring cam, which engages the engage projection of the ratchet arms and exerts pressure to ensure bracket return.

This and other objects and features of the present invention will become apparent from the description of preferred embodiment thereof, with reference to the attached drawings, in which.

Figure 1:
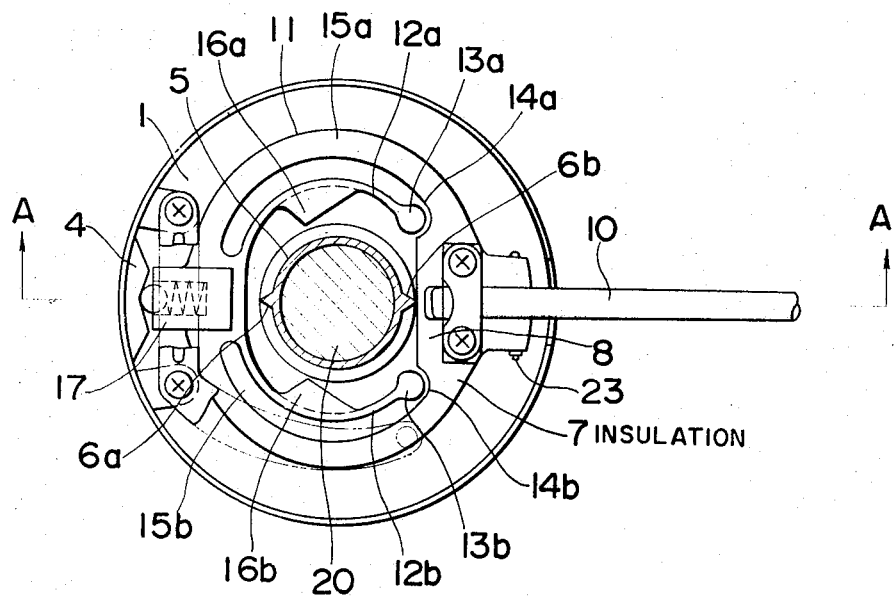
FIG. 1 is a partially cut-off plan view of an embodiment of the invention.
Figure 2:
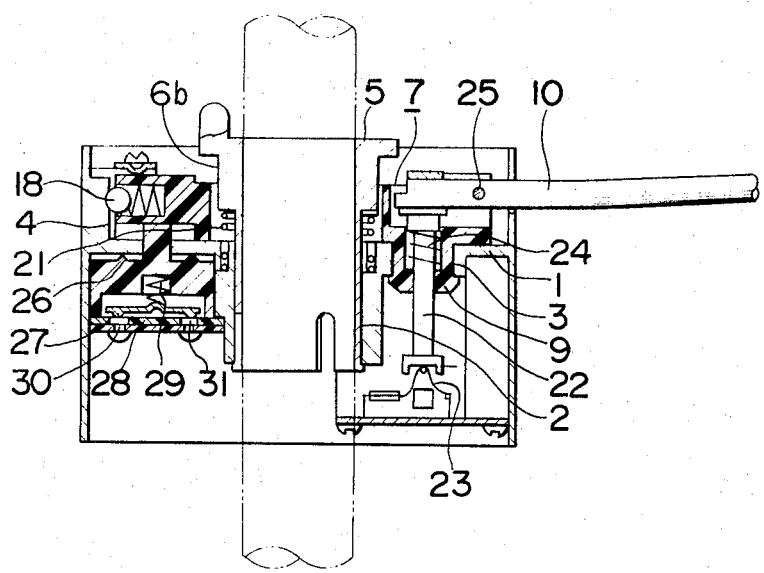
FIG. 2 is a cross-sectional views through A—A of FIG. 1.

Referring to FIGS. 1 and 2, a main body 1 includes a central hole 2, through which a steering column 20 passed, and a bearing hole 3 parallel thereto. A cylindrical restoring cam 5 which has cam lobes or projections 6a and 6b, is rotatably inserted in the hole 2, and is suitably connected to the steering column 20 passing through it so as to turn as one unit therewith. An undulate angle control assembly engagement portion 4 is attached to main body 1. A synthetic resin, movable bracket 7 is supported and free to turn on the main body 1, and comprises a seat 8, from which a hollow shaft 9 extends downwards through the bearing hole 3, and a curved circumferential portion 11 passing round either side of the steering column 20, and to which is attached a projecting control lever 10. A pair of cantilever-like ratchet arms 12a, 12b are formed integrally with the bracket curved portion 11, to which they are both attached at one end; at their other, free ends 13a, 13b the ratchet arms 12a and 12b are separated from the inner surface of the bracket curved portion 11, by narrow gaps 14a, 14b and by wider gaps 15a, 15b over their mid-portions, at approximately the centre of which are formed engagement projections 16a, 16b on the sides facing the steering column 20; as shown in FIG. 1, these projections 16a, 16b lie just outside the circle of rotation of the cam lobe 6a and 6b. A spring 19 is held in a hollow projection 17 at the outer periphery of the curved portion 11 and holds a ball 18 in the engagement portion 4, the whole forming a conventional angle-control assembly.

Figure 4:
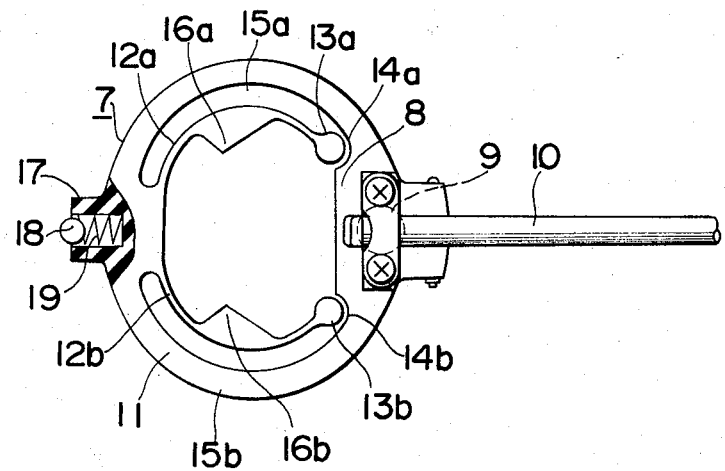
FIG. 4 is a partially cut-off plan view of the movable bracket.

The movable bracket 7 is shown in FIG. 4 as a partially cut-off plan view. As seen from FIG. 4, the narrow gaps 14a and 14b are continuous with the wider gaps 15a and 15b respectively, and the gaps 15a and 15b extend from the narrow gaps 14a and 14b to the fixed portions of the ratchet arms 12a and 12b respectively.

The projection 6b extends upwardly for engaging, during rotation, a hole in a steering wheel (not shown) to which the steering column 20 is connected at its upper end. A spring 21 pushes the cam 5 upward so the the extended portion of the projection 6b engages a hole provided at the lower surface of the steering wheel.

A push rod 22 is used to engage a head lamp switch 23, and a spring 24 pushes the push rod 22 upward against the lever 10, a shaft 25 around which the lever 10 is slightly turned to upward or downward, operates the push rod 22 to close or open the switch 23.

A contacts holder 26 is utilized in the direction indicator, wherein a movable contactor 27 contacts with fixed terminals 30 and 31 attached to an insulator complete 28, and a spring 29 is held in a hollow at the lower surface of the holder 26. The spring 29 ensures contact force between the contactor 27 and the terminals 30 and 31.

Figure 3:
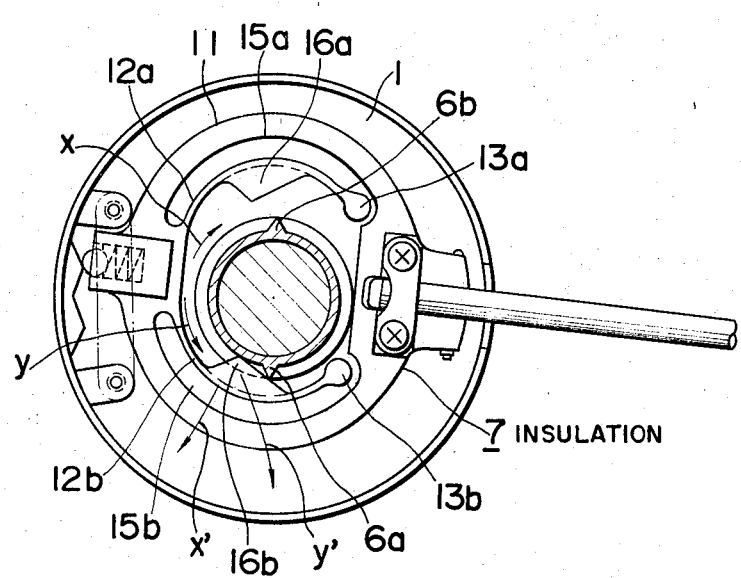
FIG. 3 is a plan view showing the operation of the embodiment of FIG. 1.

In this direction indicator, as illustrated in FIG. 3, when the movable bracket 7 is turned, to obtain indication of a turn in one direction, engagement projection 16a or 16b on one of the ratchet arms 12a or 12b is brought within the circle of rotation of one of the cam projection 6a or 6b, in this case projection 16b is brought in the circle of rotation of the cam projection 6a. When now the steering column 20 is turned in the indicated direction (as shown by the arrow X) the cam lobe 6a rides on the gently sloped face of the engagement projection 16b and pushes ratchet arm 12b in the direction of arrow X' whereupon the gap 14b between the free end 13b of the ratchet arm 12b and the bracket curved portion 11 is closed, free end 13b slides slightly along the inner surface of the curved portion 11, ratchet arm 12b is bent into an arc which has projection 16b more or less at its centre and the cam lobe 6a is allowed to pass over the projection 16b. When, after completion of the vehicle turn, the steering column 20 is turned back, in the direction of arrow y, the cam lobe 6a comes into contact with the steep face of engagement portion 16b and pushes in the direction of arrow y', here-upon the gap between the free end 13b of the ratchet arm 12b and the bracket curved portion 11 is again closed and free end 13b is pushed against the inner surface of the curved portion 11; thus, there being practically no further bending, there is formed a point of contact through which, rotatory pressure of the cam lobe 6a is applied, acting against the force of the spring 19, which temporarily holes the ball 18 in one section of the angle-control assembly, and pushing the bracket 7 back to the central, neutral position.

In this case, the engagement projection 16a of the ratchet arm 12a is not brought within the circle of rotation the cam lobe 6b. The operation of the engagement projection 16a upon the turning of the movable bracket 7 to obtain indication of a turn in other direction, is similar to that of the engagement projection 16b of the ratchet arm 12b as described above.

If for any reason at this time the bracket 7 cannot be turned back, the strong pressure of the cam lobe 6b on the engagement projection 16b causes the free end 13b pressed against the curved portion 11 to slide on 11's inner surface and the whole ratchet arm 12b to bend outwards and permit the cam lobe 6a to pass over the projection 16b; thus, the danger of the steering column 20 not being able to be turned back, which could cause a serious accident, is eliminated.

In either case described above, the wide gap 15b is not completely closed, and there is therefore no hindrance to sufficient ratchet arm bending.

Further, in the structure of the device of the invention as described above, since the cantilever-like ratchet arms 12a and 12b have in their center portions engagement projections 16a and 16b respectively, for engagement with a restoring cam, and the free ends 13a and 13b are separated from the inner surface of the bracket curved portion 11 by narrow gaps 14a and 14b, respectively, each of which is closed by only a slight flexion of the arm 12a or 12b, when the arm 12a or 12b is bent outward by pressure on its engagement portion 16a or 16b, the free end 13a or 13b contacts the curved portion 11 inner surface, and it becomes equivalent to a beam supported at both ends, i.e., the fixed end and free end 13a or 13b, hence restoring cam pressure on the centrally located engagement portion 16a or 16b sets up stresses as in a statically indeterminate beam, which offers the advantage that the flexion is sustained and breakage is prevented.

What is claimed is:

1. A direction indicator automatic return device for use in a motor vehicle comprising:

a restoring cam, secured to a steering column in the motor vehicle, having a pair of cam lobes arranged on opposite sides of the steering column;

a main body arranged concentrically around the steering column; and a movable bracket supported by said main body in concentric relation with the steering column for rotation about said steering column, said movable bracket including a curved peripheral outer portion, a pair of curved, cantilever-like ratchet arms spaced from an inner surface of said outer portion, and flexible holding means for holding said movable bracket into one of a left-turn, right-turn and neutral position, each of said pair having one end secured to said movable bracket to form a first gap between said ratchet arms and said inner surface over substantially the length of said ratchet arms and having a free end separated from said inner surface by a second smaller gap, each said ratchet arms having a triangular engagement portion disposed approximately in a central portion of each said ratchet arms and said triangular engagement portion having a vertex facing said steering column, wherein, upon rotation of said movable bracket to one of a position indicating a left turn and a right turn, one of said triangular engagement portions comes into the circle of rotation of said cam lobes so that one of said cam lobes engages an oblique side face of said one triangular engagement portion during turning of said steering column such that said free end closes said second smaller gap and contacts said inner surface, thereby forming a centrally flexible beam that enables flexion of said ratchet arm to allow said cam lobe to pass over said triangular engagement portion.

2. The device of claim 1, wherein said movable bracket is formed of a synthetic resin.

3. The device of claim 1, wherein said pair of ratchet arms are disposed on opposite sides of said steering column.

4. The device of claim 1, wherein engagement of one of said cam lobes with said triangular engagement portion of one of said ratchet arms flexes said ratchet arm to a position in which the free end contacts said inner surface.

5. The device of claim 1, wherein lever means are provided for rotating said movable bracket in the plane of said movable bracket to place said movable bracket into said one of a left-turn, right-turn and neutral position, and said lever means further being pivotally mounted with respect to said movable bracket to move in a direction perpendicular to said plane for activating a head lamp switch mounted on said main body, said head lamp switch being coupled to said lever means through a push rod.

6. The device of claim 1, wherein said ratchet arms are flexible.

* * * * *